United States Patent
Van Arnam et al.

(10) Patent No.: US 9,487,132 B2
(45) Date of Patent: Nov. 8, 2016

(54) VEHICLE WARNING LIGHTING SYSTEM

(71) Applicant: Halcore Group, Inc., Grove City, OH (US)

(72) Inventors: Mark Van Arnam, Boone, NC (US); Randy Hanson, Jefferson, NC (US); Adam Wilson, Mt. City, TN (US); Steve Dillard, West Jefferson, NC (US)

(73) Assignee: Halcore Group, Inc., Grove City, OH (US)

( * ) Notice: Subject to any disclaimer, the term of this patent is extended or adjusted under 35 U.S.C. 154(b) by 0 days.

(21) Appl. No.: 14/608,322

(22) Filed: Jan. 29, 2015

(65) Prior Publication Data

US 2015/0145269 A1     May 28, 2015

Related U.S. Application Data

(62) Division of application No. 14/074,443, filed on Nov. 7, 2013, now Pat. No. 8,973,962.

(60) Provisional application No. 61/818,734, filed on May 2, 2013.

(51) Int. Cl.
    *A61G 3/00*     (2006.01)
    *B60Q 1/52*     (2006.01)
    *B60Q 1/26*     (2006.01)

(52) U.S. Cl.
CPC . *B60Q 1/52* (2013.01); *A61G 3/00* (2013.01); *A61G 3/001* (2013.01); *B60Q 1/2611* (2013.01)

(58) Field of Classification Search
CPC .... B60Q 1/2611; Y10S 362/80; F21S 9/022; F21Y 2101/02; H01L 2924/0002
USPC ........ 296/19; 340/472, 425.5, 471; 362/493, 362/542
See application file for complete search history.

(56) References Cited

U.S. PATENT DOCUMENTS

| | | | | |
|---|---|---|---|---|
| 2,073,159 A | * | 3/1937 | Lintern | B60H 1/248 362/493 |
| 3,579,184 A | * | 5/1971 | Forestal | B60Q 1/2611 340/470 |
| 4,114,789 A | * | 9/1978 | Blaylock | B60R 13/00 224/321 |
| 4,334,211 A | * | 6/1982 | McConnell | H04R 1/023 116/147 |
| 4,577,178 A | * | 3/1986 | Hitora | B60Q 1/2611 340/472 |
| 4,611,796 A | | 9/1986 | Orr | |
| 4,630,029 A | * | 12/1986 | Hayward | B60Q 1/2611 296/218 |
| 4,707,014 A | * | 11/1987 | Rich | B60Q 1/05 296/180.1 |
| 4,953,065 A | * | 8/1990 | Kao | B60Q 1/44 362/307 |

(Continued)

FOREIGN PATENT DOCUMENTS

EP     1043218     1/2005

OTHER PUBLICATIONS

Demers Ambulances—Sustainability—Aerodynamic design; http://www.derners-ambulances.com/company/sustainability-aerodynamic-design/; 2013 Demers Ambulances; 1 page.

(Continued)

*Primary Examiner* — Kiran B Patel
(74) *Attorney, Agent, or Firm* — Hovey Williams LLP

(57) ABSTRACT

An emergency light system for an emergency vehicle. The light system can have a low profile configuration for improved aesthetics and aerodynamics. Further the light system can be configured to allow for customization of the individual emergency lights and/or easy access to the individual emergency lights.

9 Claims, 8 Drawing Sheets

(56) References Cited

U.S. PATENT DOCUMENTS

| | | | | |
|---|---|---|---|---|
| 5,097,397 A * | 3/1992 | Stanuch | B60Q 1/2611 | 340/472 |
| 5,422,623 A * | 6/1995 | Bader | B60Q 1/2611 | 340/331 |
| 5,452,188 A * | 9/1995 | Green | B60Q 1/2611 | 362/227 |
| 5,560,701 A * | 10/1996 | Payne | B60Q 1/2611 | 362/493 |
| 5,988,839 A * | 11/1999 | Pokorney | B60Q 1/30 | 362/493 |
| D419,702 S | 1/2000 | Ford et al. | | |
| 6,086,140 A | 7/2000 | McCutchen, III et al. | | |
| 6,140,918 A * | 10/2000 | Green | B60Q 1/2611 | 340/332 |
| 6,641,288 B1 * | 11/2003 | Olsen | B60Q 1/2615 | 362/477 |
| 6,937,146 B2 | 8/2005 | Tracy | | |
| 7,121,614 B2 | 10/2006 | Kawai | | |
| 7,524,075 B2 * | 4/2009 | Mastin | B60Q 1/2611 | 362/35 |
| 7,635,209 B2 * | 12/2009 | Uematsu | B60Q 1/32 | 340/479 |
| 7,959,322 B2 * | 6/2011 | Smith | B60Q 1/2611 | 362/219 |
| 2002/0109999 A1 * | 8/2002 | Strickland | B60Q 1/2611 | 362/542 |
| 2004/0227370 A1 * | 11/2004 | Bader | B60Q 1/2611 | 296/37.7 |
| 2004/0252021 A1 * | 12/2004 | Frank | B60Q 1/2611 | 340/472 |
| 2006/0002122 A1 * | 1/2006 | Griffin | B60Q 1/2611 | 362/493 |
| 2008/0137356 A1 * | 6/2008 | Smith | B60R 9/058 | 362/493 |
| 2010/0085181 A1 * | 4/2010 | Brooking | B60Q 1/2611 | 340/468 |
| 2010/0097819 A1 * | 4/2010 | Schellens | B60Q 1/2611 | 362/541 |
| 2010/0141467 A1 * | 6/2010 | Kirkpatrick | B60Q 1/2611 | 340/815.45 |
| 2011/0032718 A1 * | 2/2011 | Bryant | B60Q 1/28 | 362/497 |
| 2012/0049556 A1 * | 3/2012 | Barnes | A61G 3/008 | 296/19 |
| 2013/0300556 A1 * | 11/2013 | Wang | B60Q 1/245 | 340/471 |
| 2014/0053437 A1 * | 2/2014 | Shipman | G09F 13/20 | 40/542 |
| 2014/0059904 A1 * | 3/2014 | Shipman | G09F 13/20 | 40/542 |

OTHER PUBLICATIONS

Demers Technical Drawings; www.demers-ambulances.com; Demers Ambulances; Jun. 21, 2011; 16 pages.

* cited by examiner

VEHICLE WARNING LIGHTING SYSTEM

RELATED APPLICATIONS

This application is a divisional of co-pending U.S. patent application Ser. No. 14/074,443, filed Nov. 7, 2013, entitled "VEHICLE WARNING LIGHTING SYSTEM," which claims priority benefit of U.S. Provisional Patent Application Ser. No. 61/818,734, filed May 2, 2013, entitled "FRONT WARNING LIGHT SYSTEM," the entire disclosures of both applications are incorporated herein by reference.

FIELD OF THE INVENTION

The present invention relates generally to emergency vehicles. In particular, the invention concerns a roof mounted emergency light system for use on emergency vehicles.

BACKGROUND

Roof mounted emergency light systems have been used on emergency vehicles for years to enhance the safety of the operators of the emergency vehicle, as well as the safety of the general public encountering emergency vehicles. Over the years many advances have been made in roof mounted emergency light systems to make the lights more visible. However, many conventional roof mounted emergency light systems are rather bulky and not are aesthetically pleasing. In addition, many conventional roof mounted emergency light systems are not aerodynamic and, therefore, significantly reduced the fuel efficiency of the emergency vehicle.

In addition, although different emergency vehicles may have vastly different requirements for roof mounted emergency lighting, conventional roof mounted emergency light systems (e.g., "light bars") are generally only available in a single pre-configured light design. Further, many conventional roof mounted emergency light systems make it difficult or impossible to reconfigure and/or replace the individual emergency lights.

Accordingly, there exists a need for a more aesthetically pleasing and aerodynamic roof mounted emergency light system that can be customized with various light configurations and provides easy access to individual lights for reconfiguration and/or replacement of individual emergency lights.

SUMMARY OF THE INVENTION

In one embodiment of the present invention, there is provided a roof-mounted emergency light system for an emergency vehicle. The emergency light system includes a base and a lens assembly. The base is configured for attachment to a roof of the emergency vehicle and the lens assembly is coupled to the base. The base includes an inner light supporting region comprising a plurality of generally upright emergency light supporting surfaces. The base presents a generally upwardly facing lens supporting surface extending around at least a portion of the light supporting region. The lens assembly presents a generally downwardly facing attachment surface having a shape that substantially conforms to the shape of the lens supporting surface.

In another embodiment, there is provided a roof-mounted emergency light system for an emergency vehicle having a roof with a sloped portion. The emergency light system includes a base, a plurality of emergency lights, and a lens assembly. The base is configured for attachment to the sloped portion of the roof. The base includes an inner light supporting region comprising a plurality of emergency light supporting surfaces to which the emergency lights are coupled. The lens assembly is coupled to the base and covers the inner light supporting region. The lens assembly includes one or more lenses through which light from the emergency lights can pass. The emergency light system has a maximum depth (Dmax) and a maximum height (Hmax), where the ratio of Dmax to Hmax is at least 1.5:1. The emergency light system has a maximum width (Wmax). The ratio of Wmax to Dmax is at least 1.25:1 and not more than 4:1. The base is configured to cover at least 4 square feet of the roof and the lenses cooperatively present a total outer surface area of at least 2 square feet.

In yet another embodiment, there is provided an emergency vehicle that includes a cab having a roof with a sloped portion, emergency service equipment located behind the cab, and an emergency light system coupled to the sloped portion of the roof. The sloped portion of the roof slopes a vertical distance of at least 6 inches over a horizontal distance of 12 inches. The emergency light system has a maximum depth (Dmax) and a maximum height (Hmax), where the ratio of Dmax to Hmax is at least 1.25:1.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the invention. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present invention can include a variety of combinations and/or integrations of the embodiments described herein.

Figure 1:
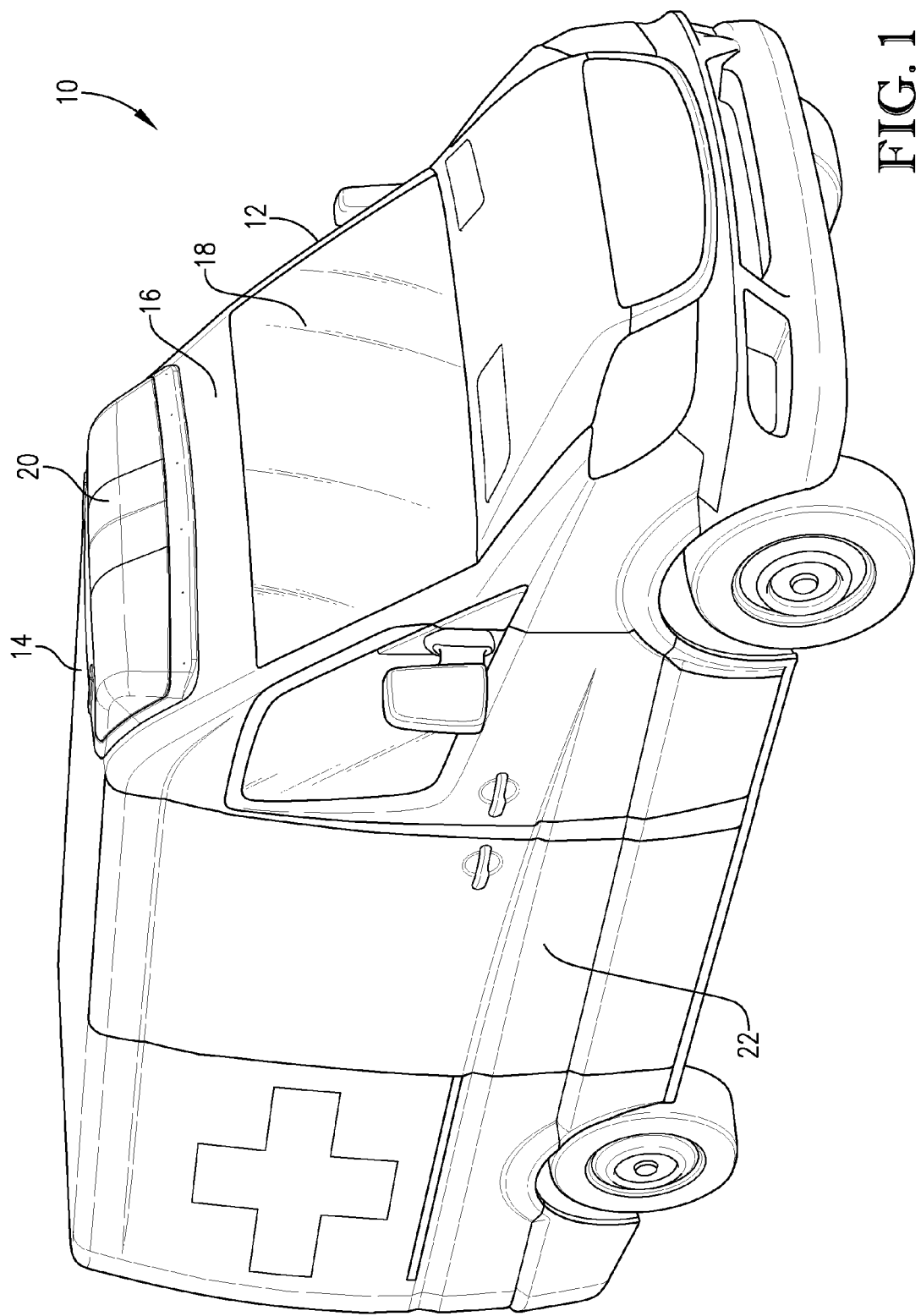
FIG. 1 is an isometric view of an emergency vehicle having a cab with a sloped roof to which is attached an emergency light system configured in accordance with certain embodiments of the present invention.
Figure 2:
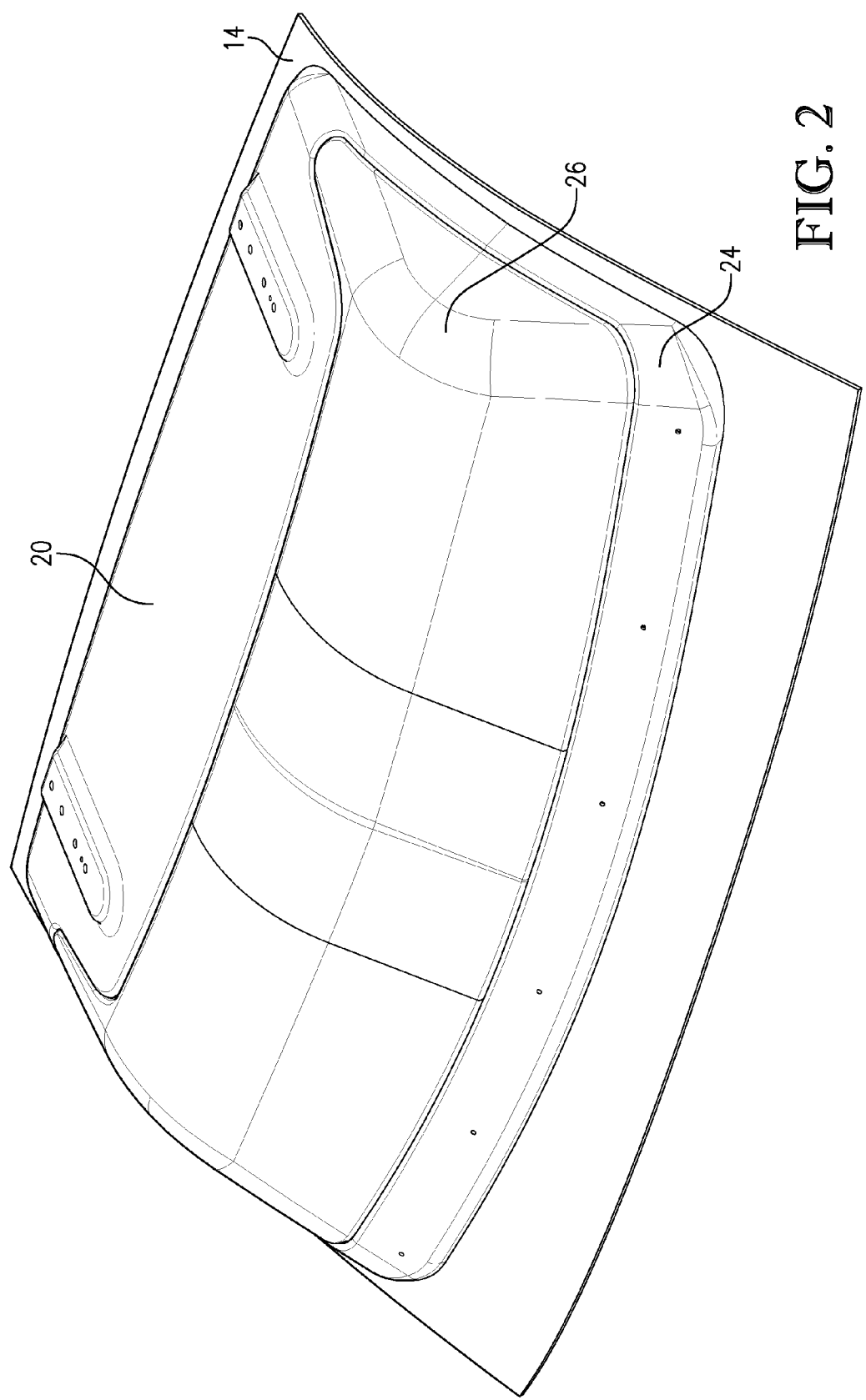
FIG. 2 is an enlarged isometric view of the sloped portion of the emergency vehicle roof with the emergency light system being attached thereto, particularly illustrating the emergency light system as including a base coupled to the roof and a lens assembly coupled to the base.

FIG. 1 depicts an emergency vehicle 10 having a cab 12 that presents a roof 14 having a sloped portion 16. The cab includes a windshield 18 and the sloped portion 16 of the roof 14 is positioned immediately above and extends generally upwardly and rearwardly from the windshield 18. An emergency light system 20 is coupled to the roof 14 of the emergency vehicle 10 and covers at least a portion of the sloped portion 16.

The emergency vehicle 10 shown in FIG. 1 is an ambulance having a patient compartment 22 located immediately behind the cab 12. Although the present invention is shown in the drawings as being implemented in an ambulance, it should be understood that various other types of emergency vehicles (e.g., fire trucks and tow trucks) can employ the invention. Generally, any emergency vehicle having a sloped roof portion on the cab is suitable for use in conjunction with the present invention. These emergency vehicles typically carry some type of emergency equipment behind the cab of the vehicle. In the case of an ambulance, the emergency equipment carried by the vehicle includes medical equipment, whereas in the case of a fire truck, the emergency equipment carried by the vehicle may include firefighting equipment and/or medical equipment.

As shown in FIGS. 2-6, the emergency light system 20 includes a base 24 coupled to the roof 14 and a lens assembly 26 coupled to and supported by the base 24. As perhaps best illustrated in FIG. 3, the emergency light system 20 can be mounted on a portion of the roof 14 having a sloped portion 16. The sloped portion 16 of the roof 14 can slope a vertical distance of at least 6, 8, or 10 inches and/or not more than 18, 16, 14, or 12 inches over a horizontal distance of 12 inches. Additionally, or alternatively, the sloped portion 16 of the roof 14 can slope a vertical distance of at least 8, 10, or 12 inches and/or not more than 20, 18, 16, or 14 inches over a horizontal distance of 18 inches. In certain embodiments, the sloped portion 16 extends across substantially the entire width of the roof 14 of the cab 12. For example, the sloped portion 16 of the roof 14 can have a width of at least 2, 4, or 5 feet.

As illustrated in FIGS. 3-6, the lens assembly 26 can be formed of one or more lenses 28 that are rigidly coupled to a lens support structure 30. In certain embodiments, at least two of the lenses 28 are colored differently from one another. For example, one or more of the lenses 28 can be red, while one or more of the lenses 28 can be substantially clear. In the embodiment depicted in the drawings, the emergency light system 20 includes three individual lenses 28, with the outside two lenses being red and the central lens being clear. When multiple lenses are used, a lens ceiling gasket 33 (FIG. 6) can be used between the individual lenses 28 to prevent moisture or debris from entering between the lenses 28.

Figure 3:
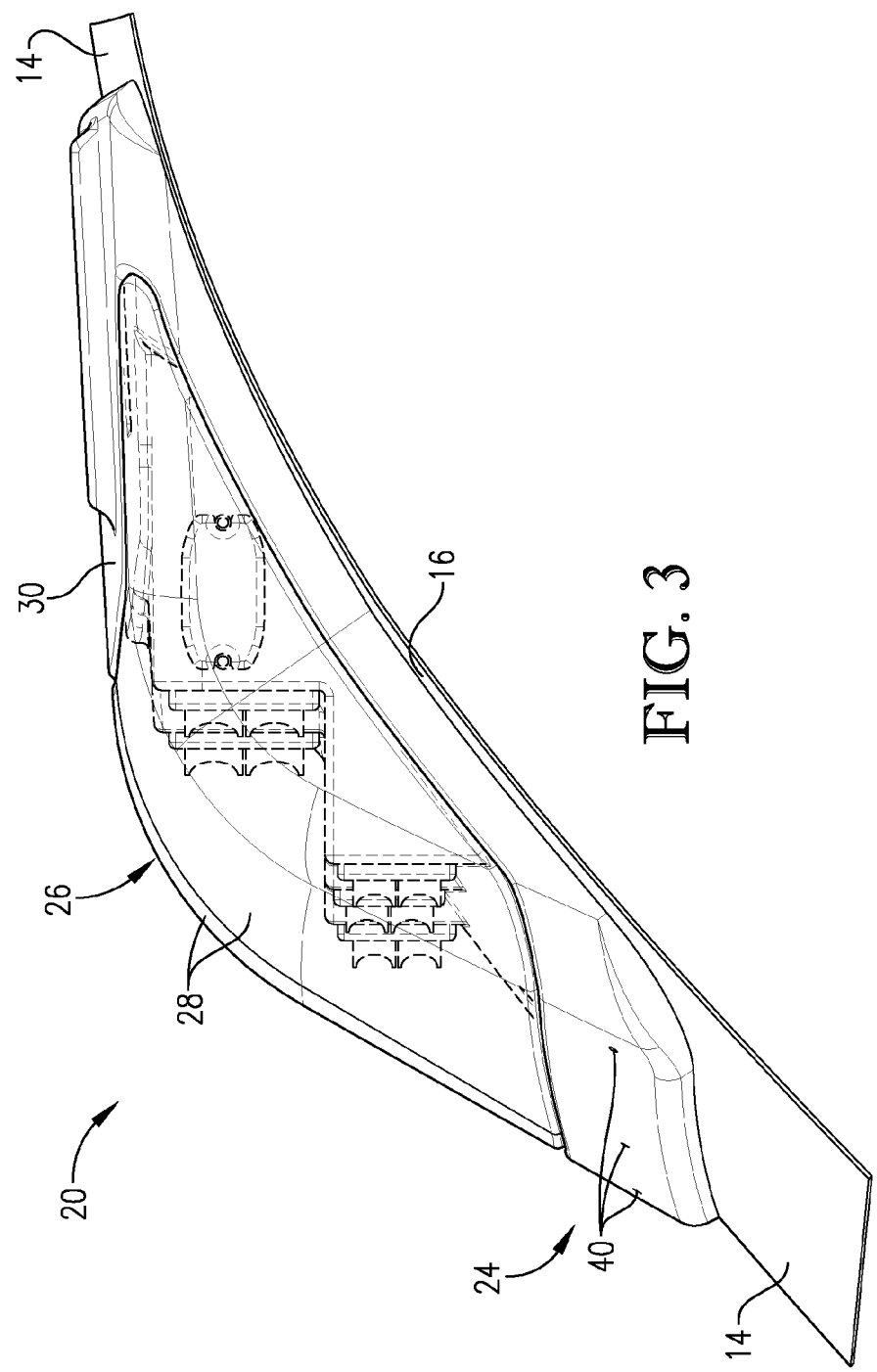
FIG. 3 is a side view of the emergency light system attached to the sloped portion of the emergency vehicle roof, particularly illustrating the lens assembly in a closed position relative to the base.
Figure 4:
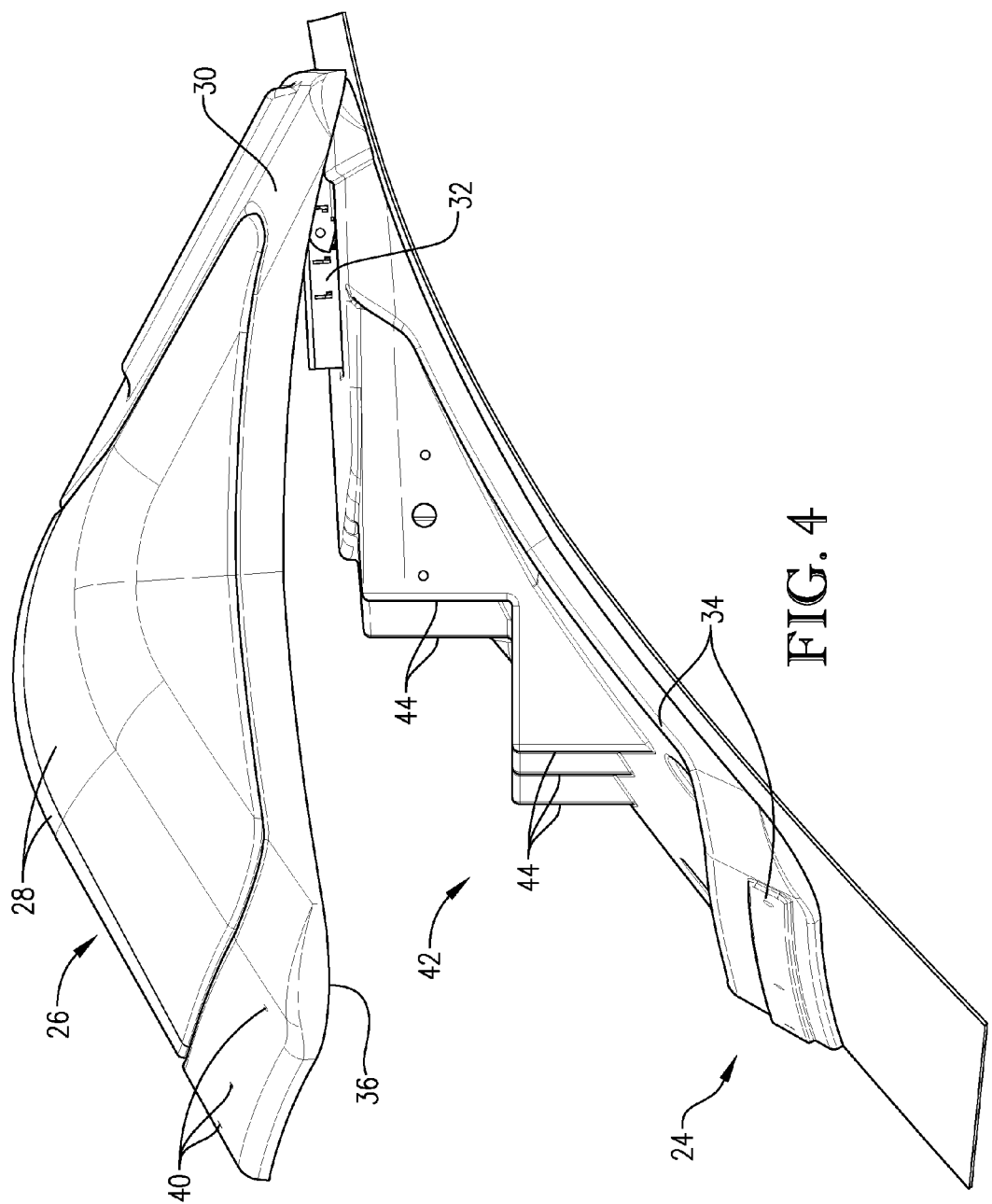
FIG. 4 a side view of the emergency light system attached to the sloped portion of the emergency vehicle roof, particularly illustrating the lens assembly in an open position relative to the base, so as to provide access to the interior light supporting region of the emergency light system.
Figure 5:
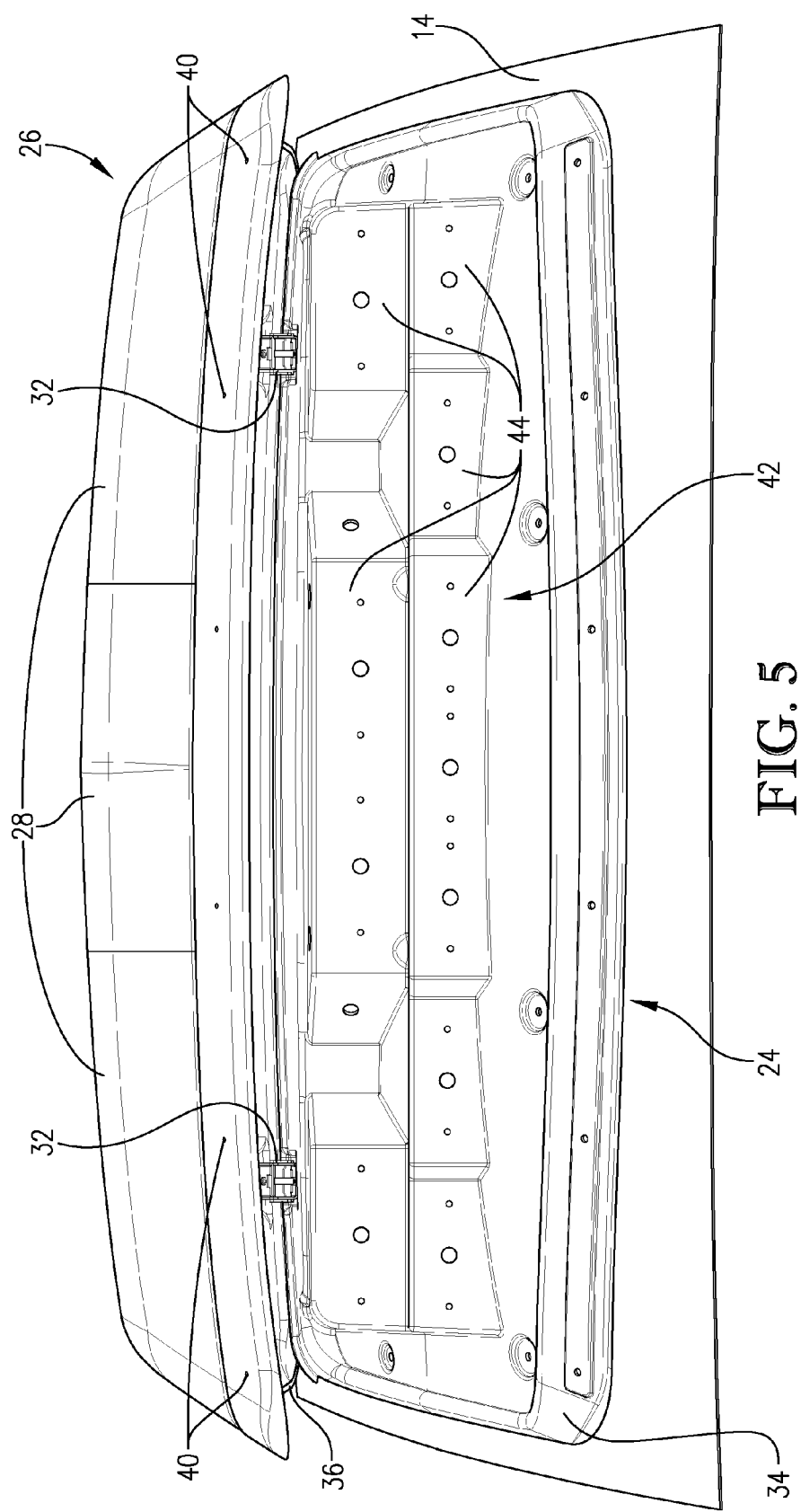
FIG. 5 is a front view of the emergency light system in an open position, particularly illustrating the configuration of the light supporting surfaces in the interior of the emergency light system.

As perhaps best shown in FIGS. 3-5, the emergency light system 20 can also include a hinge 32 (shown in FIGS. 4 and 5) that couples the lens assembly 26 to the base 24 and allows the lens assembly 26 to be shifted relative to the base 24 between a closed position (shown in FIG. 3) and an open position (show in FIGS. 4 and 5). In certain embodiments, the hinge 32 is a locking hinge that is capable of supporting the lens assembly 26 in the open position without additional external support.

Figure 6:
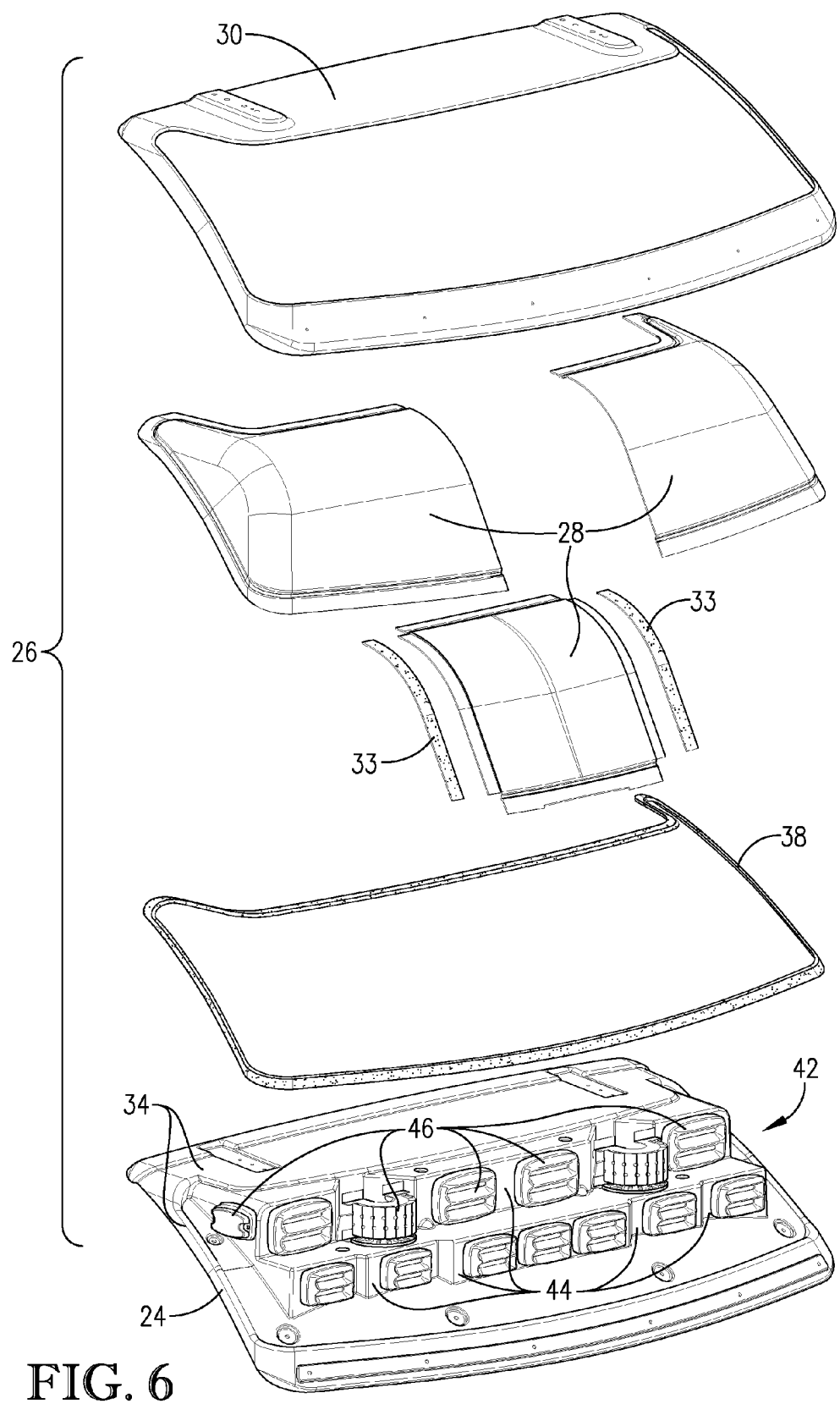
FIG. 6 is an exploded view showing the individual components of the emergency light system, particularly illustrating how the lens assembly is formed of a lens support structure that supports the plurality of individual lenses.

As illustrated in FIGS. 4 and 5, the base 24 presents a lens supporting surface 34 and the lens assembly 26 presents an attachment surface 36. The shape of the attachment surface 36 substantially conforms to the shape of the lens supporting surface 34 so that when the lens assembly 26 is in the closed position, the lens supporting surface 34 and attachment surface 36 contact one another with minimal or no gaps therebetween. As shown in FIG. 6, a sealing gasket 38 can be attached to one of the lens supporting and attachment surfaces 34, 36 so that when the lens assembly 26 is in the closed position, the gasket 38 is disposed between the lens supporting surface 34 and attachment surface 36. This gasket 38 can extend entirely around the interior of the emergency light system 20 to prevent moisture and debris from entering the inside of the emergency light system 20. The gasket 38 can be made of any relatively flexible material known in the art as being suitable for use as a seal between two rigid surfaces.

The emergency light system 20 can also include one or more locking mechanisms 40 (FIG. 3) for coupling the lens assembly 26 to the base 24 in the closed position. The locking mechanisms 40 can be any suitable releasable fastener capable of coupling the front and/or sides of the lens assembly 26 to the front and/or sides of the base 24. In one embodiment, the locking mechanisms 40 are simply one or more screws. In another embodiment, the locking mechanisms 40 can include one or more quick-release fasteners, such as draw latches, that permit rapid coupling and decoupling of the lens assembly 26 and the base 24. The hinge 32 and locking mechanisms 40 permit ready access to the interior of the emergency light system 20 so that the individual lights contained therein can be readily reconfigured, repaired, or replaced.

When the lens assembly 26 is in the open position, as shown in FIGS. 4 and 5, external access is permitted to a light supporting region 42 of the base 24. The light supporting region 42 includes a plurality of light supporting surfaces 44 to which individual emergency lights 46 can be coupled. In certain embodiments, the light supporting region 42 includes at least 4, 6, 8, 10, or 12 of the light supporting surfaces 44. These light supporting surfaces 44 can be substantially flat and/or substantially vertical. Further, at least a portion of the light supporting surfaces 44 can be at different elevations and/or can face in different directions. In the embodiment depicted in FIGS. 4-6, the light supporting surfaces 44 include an upper group of light supporting surfaces and a lower group of light supporting surfaces, where the upper group of light supporting surfaces are located at a higher elevation than the lower group of light supporting surfaces and are also horizontally offset rearwardly relative to the lower group of light supporting surfaces. This variety in position and direction of the light supporting surfaces 44 permits the same base 24 to be used for a variety of different light configurations.

Figure 7:
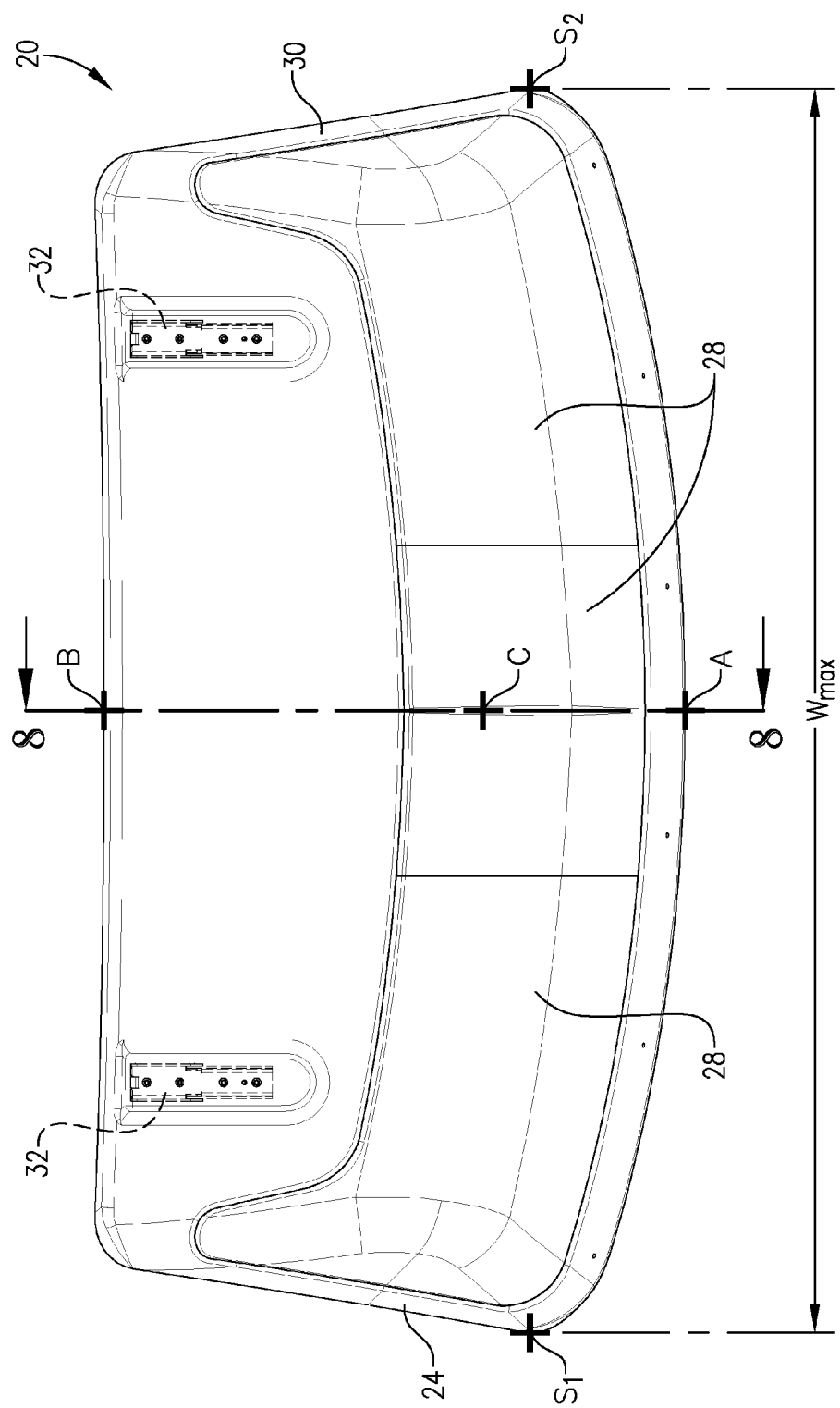
FIG. 7 is a top view of the emergency light system showing various reference points and parameters used to define the unique shape of the emergency light system.
Figure 8:
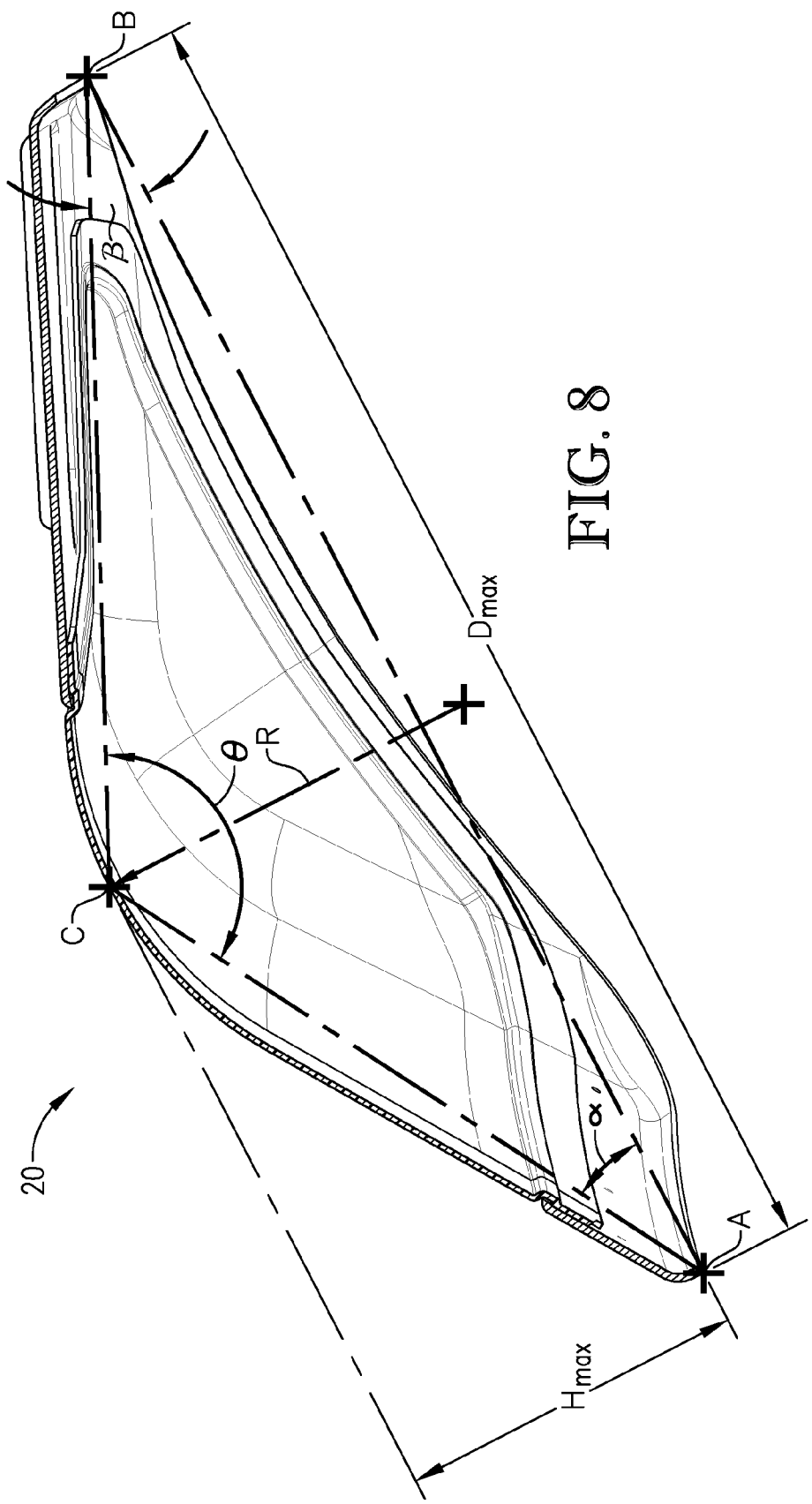
FIG. 8 is a cross-sectional view of the emergency light system taken along line 8-8 in FIG. 7 showing various reference points and parameters used to define the unique shape of the emergency light system.

FIGS. 7 and 8 show various reference lines, references points, and dimensions used to define the unique shape of the emergency light system 20. As mentioned previously, in certain embodiments, the emergency light system 20 covers a large area of the roof of the emergency vehicle. For example, the base 24 can be sized to cover at least 2, 4, 6, 8, or 10 square feet of the emergency vehicle roof. Further, the lenses 28 of the lens assembly 26 can be relatively large so that many individual emergency lights can shine therethrough. Thus, the lenses 28 can present a total outer surface area of at least 2, 4, or 5 square feet through which light from the individual emergency lights can shine.

In certain embodiments the emergency light system 20 can have a relatively low profile. As depicted in FIG. 8, this low profile configuration can be at least partly quantified by the ratio of the maximum depth (Dmax) of the emergency light system 20 to the maximum height (Hmax) of the emergency light system 20.

Referring to FIG. 8, Dmax is defined herein as the maximum dimension from the front edge of the emergency light system 20 to the rear edge of the emergency light system 20, measured in the direction of travel in the emergency vehicle. In certain embodiments, Dmax can be at least 12, 18, or 24 inches and/or not more than 48, 42, or 36 inches. As shown in FIG. 8, Dmax is measured between a reference point "A" and a reference point "B." Reference point "A" is the point on the front edge of the base 24 located at the maximum depth of the emergency light system 20, while reference point "B" is the point on the rear edge of the base 24 located at the maximum depth of the emergency light system 20. A reference line AB is defined between reference point "A" and reference point "B."

Referring again to FIG. 8, Hmax is defined herein as the maximum dimension from the top of the emergency light system 20 to reference line AB, measured perpendicular to reference line AB in a vertical reference plane that includes reference line AB. In certain embodiments, Hmax can be at least 4, 6, or 8 inches and/or not more than 24, 16, or 12 inches. As shown in FIG. 8, Hmax is measured from reference line AB to a reference point "C." Reference point "C" is the point on the exterior peak of the lens assembly 26 that is farthest from reference line AB, measured perpendicular to reference line AB in the vertical plane that includes reference line AB. The ratio of Dmax to Hmax can be at least 1.25:1, 1.5:1, 1.75:1, 2:1, 2.25:1, 2.5:1, 2.75:1, or 3:1. Further, the ratio of Dmax to Hmax can be not more than 20:1, 15:1, 10:1, 8:1, or 6:1.

In the embodiment depicted in FIG. 8, reference point "A" represents a central front edge point of the emergency light system 20, reference point "B" represents a central rear edge point of the emergency light system 20, and reference point "C" represents a central peak point of the emergency light system 20. As shown in FIG. 8, a reference line AC extends between reference points "A" and "C" and a reference line BC extends between reference points "B" and "C." Due to the low profile nature of the emergency light system 20 depicted in the drawings, an obtuse interior angle "θ" is defined between reference lines AC and BC. This obtuse interior angle "θ" can be at least 100, 110, or 120 degrees and/or not more than 170, 160, or 150 degrees. Further, a first acute interior angle "α" is defined between reference lines AB and AC, where "α" can be at least 10, 15, or 20 degrees and/or not more than 80, 60, or 50 degrees. In addition, a second acute interior angle "β" is defined between reference lines AB and BC, where "β" can be at least 10, 15, or 20 degrees and/or not more than 80, 60, or 50 degrees. The rounded and low profile nature of the emergency light system 20 can also be at least partially defined by the external radius of curvature "Rp" at reference point "C" (the central peak point). In certain embodiments, "Rp" can be at least 2, 4, 6, 8, or 10 inches.

As shown in FIG. 7, the emergency light system 20 can have a maximum width (Wmax) that is measured from the outer point "S1" on one side of the emergency light system 20 to the outer point "S2" on the opposite side of the emergency light system 20. Wmax is measured perpendicular to the direction of travel of the emergency vehicle to which the emergency light system 20 is mounted. In certain embodiments, the ratio of Wmax to Dmax is at least 1:1, 1.25:1, 1.5:1, or 2:1 and/or not more than 4:1, 3:1, or 2.5:1.

Although the invention has been described with reference to the preferred embodiment illustrated in the attached drawing figures, it is noted that equivalents may be employed and substitutions made herein without departing from the scope of the invention.

Having thus described various embodiments of the invention, what is claimed as new and desired to be protected by Letters Patent includes the following:

1. An emergency vehicle comprising:
a cab having roof presenting a sloped portion that slopes a vertical distance of at least 6 inches over a horizontal distance of 12 inches;
emergency service equipment located behind said cab; and
an emergency light system coupled to said sloped portion of said cab,
wherein said emergency light system has a maximum depth (Dmax) and a maximum height (Hmax), wherein the ratio of Dmax to Hmax is at least 1.25:1,
wherein said emergency light system comprises a base, a lens assembly, and a plurality of emergency lights, wherein said base is attached to said sloped roof portion, wherein said base includes a light supporting region comprising a plurality of emergency light supporting surfaces, wherein said a plurality of emergency lights are coupled to said emergency light supporting surfaces, wherein said lens assembly is coupled to said base and covers emergency lights, wherein said lens assembly comprises one or more lenses through which light from said emergency lights can pass.

2. The emergency vehicle of claim 1, wherein said sloped portion of said roof slopes a vertical distance of at least 8 inches and not more than 16 inches over a horizontal distance of 12 inches.

3. The emergency vehicle of claim 1, wherein said sloped portion of said roof slopes a vertical distance of at least 10 inches and not more than 18 inches over a horizontal distance of 18 inches.

4. The emergency vehicle of claim 1, wherein said cab comprises a front windshield, wherein said sloped portion of said roof is located immediately above said front windshield.

5. The emergency vehicle of claim 1, wherein said emergency vehicle is an ambulance comprising a patient compartment and said emergency service equipment is medical equipment housed in said patient compartment.

6. The emergency vehicle of claim 1, wherein said emergency light system further comprises a hinge coupling said base and said lens assembly to one another, wherein said hing is configured to permit shifting of said lens assembly relative to said base between an open position and a closed position, wherein external access to said light supporting region is prevented when said lens assembly is in said closed position and external access to said light supporting region is permitted when said lens assembly is in said open position, wherein said emergency light system further comprises one or more releasable locking mechanisms for selectively locking said lens assembly in said closed position.

7. The emergency vehicle of claim 1, wherein said base is configured to cover at least 4 square feet of said roof.

8. The emergency vehicle of claim 1, wherein the ratio of Dmax to Hmax is at least 2:1, wherein said emergency light system has a maximum width (Wmax), wherein the ratio of Wmax to Dmax is at least 1.25:1 and not more than 3:1.

9. The emergency vehicle of claim 1, wherein said emergency light system presents a central front edge point (A), a central rear edge point (B), and a central peak point (C), wherein an obtuse interior angle ($\theta$) is defined between references lines extending from C to A and C to B, wherein $\theta$ is at least 100 degrees and not more than 170 degrees, wherein the external radius of curvature (Rp) of said emergency light system at said central peak point (C) is at least 2 inches.

\* \* \* \* \*